United States Patent
Adel et al.

[11] Patent Number: 5,958,126
[45] Date of Patent: Sep. 28, 1999

[54] BISMUTH VANADATE PIGMENTS

[75] Inventors: Jörg Adel, Ludwigshafen; Boubacar Camara, Auenwald; Norbert Mronga, Dossenheim, all of Germany

[73] Assignee: BASF Aktiengesellschaft, Ludwigshafen, Germany

[21] Appl. No.: 08/958,682

[22] Filed: Oct. 27, 1997

[51] Int. Cl.⁶ .................... C04B 14/00; C01G 29/00
[52] U.S. Cl. .................... 106/479; 423/593; 428/403; 428/404
[58] Field of Search .................... 106/479; 423/593; 428/403, 404

[56] References Cited

U.S. PATENT DOCUMENTS

| | | | |
|---|---|---|---|
| 4,529,448 | 7/1985 | Koehler et al. | 106/453 |
| 5,336,312 | 8/1994 | Byrne et al. | 106/479 |
| 5,399,197 | 3/1995 | Vermoortele et al. | 106/479 |

FOREIGN PATENT DOCUMENTS

| | | |
|---|---|---|
| 1 592 388 | 12/1970 | Germany . |
| 40 02 943 | 8/1991 | Germany . |

OTHER PUBLICATIONS

Ya.N. Blinovskov, et al., Russian Journal of Inorganic Chemistry, vol. 31, No. 1, pp. 145 and 146, 1987, "The $BI_2O_3$–$V_2O_5$ System".

Marcel Touboul, et al., Acta Cryst., vol. C48, pp. 1176–1179, 1992, "Structure of Dibismuth Vanadate $BI_2VO_{5.5}$".

*Primary Examiner*—Melissa Koslow
*Attorney, Agent, or Firm*—Oblon, Spivak, McClelland, Maier & Neustadt, P.C.

[57] ABSTRACT

Bismuth vanadate pigments of the formula $(Bi_4V_2O_{11})_{1-x} \cdot (BiVO_4)_x$, where $0 \leq x < 0.9$, further comprising from 0 to 0.5% by weight of phosphorus in the form of bismuth phosphate, are characterized by a CIELAB hue angle of from 64 to 91°, a chroma of from 72 to 95 and a lightness $\geq 62$ (measuring angle 45°, standard illuminant D65).

17 Claims, No Drawings

BISMUTH VANADATE PIGMENTS

DESCRIPTION

The present invention relates to bismuth vanadate pigments of the formula $(Bi_4V_2O_{11})_{1-x} \cdot (BiVO_4)_x$, where $0 \leq x < 0.9$, further comprising from 0 to 0.5% by weight of phosphorus in the form of bismuth phosphate, characterized by a CIELAB hue angle of from 64 to 91°, a chroma of from 72 to 95 and a lightness $\geq 62$ (measuring angle 45°, standard illuminant D65).

The invention further relates to the preparation of these pigments and to their use for coloring polymeric systems, especially coatings, printing inks and plastics.

The invention also relates to colored preparations comprising a colorable material and these bismuth vanadate pigments as coloring pigment.

A general move is under way to substitute lead-free pigments for the lead chromates used as yellow to reddish orange pigments. This has been achieved in the yellow spectrum by the use of bismuth vanadate pigments. No satisfactory replacement has been found for the reddish yellow to reddish orange lead chromate/molybdate pigments, apart from some bismuth oxide/chromium oxide mixed-phase pigments (DE-A-15 92 388, DE-A-33 15 849 and DE-A-40 02 943), which are likewise toxicologically unsafe because of the content of chromium(VI).

According to the differential thermal analyses published in the Russian Journal of Inorganic Chemistry 32 (1987), 145–146, a number of bismuth vanadates having a higher bismuth content than $BiVO_4$ exist in the bismuth oxide/vanadium oxide system. One of these vanadates is $Bi_4V_2O_{11}$, which is described as a brown compound. Similarly, the crystal structure analysis described in Acta Cryst. C48 (1992), 1176–1179, was carried out on a reddish brown $Bi_4V_2O_{11}$ single crystal.

It is an object of the present invention to provide pigments for the reddish yellow to orange spectrum which do not contain toxic metals and which can be prepared in an economical manner.

We have found that this object is achieved by bismuth vanadate pigments of the formula $(Bi_4V_2O_{11})_{1-x} \cdot (BiVO_4)_x$, where $0 \leq x < 0.9$, further comprising from 0 to 0.5% by weight of phosphorus in the form of bismuth phosphates characterized by a CIELAB hue angle of from 64 to 91°, a chroma of from 72 to 95 and a lightness $\geq 62$ (measuring angle 45°, standard illuminant D65).

The invention also provides a process for preparing these bismuth vanadate pigments, said process comprising calcining a homogeneous mixture of bismuth oxide and vanadium oxide at from 600 to 900° C. for from 2 to 12 h, slowly cooling the calcination product down to room temperature, the cooling down to about 200° C. taking not less than from 6 to 20 h, and then subjecting the cold calcination product to a grinding process and optionally thereafter treating an aqueous suspension of the ground calcination product with a peroxo compound.

The invention further provides a process for preparing these bismuth vanadate pigments, this process comprising heating an acidic bismuth salt solution to not more than 105° C. in the presence of dissolved phosphate, adding initially from 200 to 400 mol %, based on bismuth, of an alkali metal hydroxide in the form of an aqueous solution and then a vanadate solution, on completed precipitation adjusting the pH of the mixture to 2–6, stirring the mixture for 0.5–5 h and thereafter performing steps whereby the precipitated product is isolated, washed salt-free, optionally dried, ground, calcined at from 500 to 800° C. for from 0.5 to 3 h, slowly cooled down to room temperature, the cooling down to about 200° C. taking not less than 6 h, ground again and optionally then treated in aqueous suspension with a peroxo compound.

The present invention lastly provides a process for preparing these bismuth vanadate pigments, this process comprising introducing an acidic bismuth salt solution, a vanadate solution and a phosphate solution simultaneously into hot water at not more than 100° C. while maintaining the pH of the mixture at from 0.8 to 3 with an alkali metal hydroxide, on completed precipitation adjusting the pH of the mixture to 2–6, stirring the mixture for 0.5–5 h and thereafter performing steps whereby the precipitated product is isolated, washed salt-free, optionally dried, ground, calcined at from 500 to 800° C. for from 0.5 to 3 h, slowly cooled down to room temperature, the cooling down to about 200° C. taking not less than 6 h, ground again and optionally then treated in aqueous suspension with a peroxo compound.

Last but not least, the present invention provides for the use of these bismuth vanadate pigments for coloring polymeric systems, especially coatings, printing inks and plastics.

The bismuth vanadate pigments of the invention have the formula $(Bi_4V_2O_{11})_{1-x} \cdot (BiVO_4)_x$, where $0 \leq x < 0.9$; that is, the bismuth vanadate pigments of the invention range from homogeneous physical mixtures of $Bi_4V_2O_{11}$ and $Bi_4VO_4$ to "pure" $Bi_4V_2O_{11}$. They may further comprise up to 0.5% by weight (preferably from 0.05 to 0.4% by weight, particularly preferably around 0.3% by weight) of phosphorus in the form of incorporated bismuth phosphate, in which case x is preferably within the range from 0.2 to 0.8.

The bismuth vanadate pigments of the invention are characterized by advantageous CIELAB values such as a hue angle of from 64 to 91°, a chroma of from 72 to 95 and a lightness $\geq 62$ (measuring angle 45°, standard illuminant D65), the pigments which further comprise phosphate being notable for particularly high chroma values and color strengths. Variation of their composition permits specific preparation of a pigment having a desired hue within the hue range from reddish yellow to orange. They are therefore highly useful for replacing the undesirable lead chromate pigments.

What is surprising in this connection is that $Bi_4V_2O_{11}$ can be obtained in the form of a brilliant orange pigment, since the literature only describes brown to reddish brown products for this composition.

The bismuth vanadate pigments of the invention can be prepared with advantage by a likewise novel process, either by pure calcination (variant a)) or by a combination of a wet-chemical precipitation process with a calcination (variants b1) and b2)).

The essential aspect of the calcining step which forms part of all the preparative processes of the invention is that the calcination product is cooled down slowly. The temperature range from the calcination temperature down to about 200° C. should take not less than 6 h, customarily from 6 to 20 h, preferably from 10 to 18 h, particularly preferably from 12 to 16 h. The calcination product, which is advantageously cooled down further to room temperature, is then subjected to a grinding process to convert it to a particle size suitable for application as a pigment.

The mixture of bismuth oxide and vanadium oxide used in the calcination of variant a) is advantageously prepared by intensive mixing of the components in the dry or wet state. A favorable form of achieving intensive mixing is conjoint grinding in a stirred ball mill or in a disperser, for example a Red Devil, in the presence of grinding assistant. Preference is given to a wet grinding process, but homogeneous products having a high chroma are also obtained from dry-mixed or -ground preproducts provided calcination is carried out for longer periods.

To improve the quality of the calcination product (improved homogeneity, chroma and lightness), it is advantageous, especially in the case of variant a), to interrupt the calcination at least once, preferably twice, and to precipitate the mixture, after it has been cooled down rapidly, to a dry grinding process. The time required for cooling and grinding does not count as part of the calcination time.

Suitable calcination temperatures in the case of variant a) range from 600 to 900° C., preferably from 700 to 800° C., particularly preferably from 740 to 780° C. The calcination time is generally within the range from 2 to 12 h, especially within the range from 4 to 6 h.

In the case of variants b1) and b2), in which a precipitation product is calcined, it is sufficient to use calcination temperatures generally within the range from 500 to 800° C., preferably within the range from 600 to 700° C., particularly preferably within the range from 620 to 670° C. The calcination time is customarily shorter too, generally ranging from 0.5 to 3 h, preferably from 1 to 2 h.

The precipitation product can advantageously be prepared by variant b1) or b2).

In the case of variant b1), an advantageous procedure is as follows:

A mixture of an aqueous acidic bismuth salt solution and dissolved phosphate is heated with stirring to generally 80–105° C., preferably 95–100° C.

Suitable bismuth salts include in particular bismuth nitrate, and the suitable soluble phosphates include not only alkali metal phosphates and hydrogenphosphates such as potassium phosphate and sodium phosphate but also, especially, phosphoric acid.

The amount of phosphate used is customarily within the range from 2 to 10 mol %, preferably within the range from 4.5 to 7.5 mol %, based on bismuth.

From 200 to 400 mol %, preferably from 300 to 350 mol %, of an alkali metal hydroxide, based on bismuth, are then added slowly (generally over 10–60 min) while the temperature is maintained.

The alkali metal hydroxide used is customarily sodium hydroxide, especially 10–50, in particular about 30, % strength by weight aqueous sodium hydroxide solution.

The next step is the slow (customarily over 20–60 min) addition of an aqueous vanadate solution, preferably in an amount which substantially corresponds to the desired stoichiometry, to obtain a molar ratio of bismuth to vanadium which is preferably within the range from 1.1:1 to 1.8:1.

Examples of suitable vanadates in this connection are ammonium and alkali metal vanadates such as potassium vanadate and especially sodium vanadate.

The precipitated product is ripened by subsequent stirring for some time (generally for from 0.5 to 3 h) at the abovementioned temperature, then adding further base to set a pH of generally from 2 to 6, preferably about 3, and further stirring for about 0.5–5 h.

After cooling down to room temperature, the precipitated product can be isolated in a conventional manner, by filtration, washing salt-free and optionally drying.

Prior to the calcination it is advantageous to grind the precipitation product, for example in a stirred ball mill. The grinding can be carried out dry or wet, preference being given to grinding in aqueous suspension, so that the preceding drying step can be omitted.

In the case of variant b2), an advantageous procedure to prepare the precipitation product is as follows:

Water is charged initially and heated, preferably to the boil (although it is also possible to use a lower temperature down to room temperature), and admixed (preferably with continued heating) with bismuth salt solution, vanadate solution and phosphate solution (amount and type of the starting compounds correspond to the particulars in the case of variant b1)) being added slowly and simultaneously while the pH of the mixture is kept constant within the range from about 0.8 to 3 by addition of an alkali metal hydroxide, preferably aqueous sodium hydroxide solution.

The completion of the precipitation and the isolation of the precipitation product and its grinding can be accomplished similarly to variant b1).

The grinding which, in all process variants, follows the calcination and is preferably likewise a wet grinding process in the presence of water can be carried out for example in a stirred ball mill which is generally operated at from 500 to 1000 rpm. Suitable grinding media include for example glass balls or sand grains from about 0.5 to 2 mm in diameter in each case.

Customary grinding times range from 2 to 12 h according to the invention.

After the grinding media have been separated off, the millbase can be isolated in a conventional manner, by filtration, washing with water and drying.

The bismuth vanadate pigments obtained in this way generally have average particle sizes from 0.5 to 2 μm, preferably from 0.7 to 1.5 μm, particularly preferably 0.7 to 1 μm, and have a color which, depending on their composition, ranges from orange ($Bi_4V_2O_{11}$) to reddish yellow.

The hue angle of the ground pigments can be further reduced (generally by from 0.5 to 2°) and their chroma further increased (generally by from 0.5 to 3) by the additional treatment with peroxo compounds according to the invention. In this way, particularly reddish bismuth vanadate pigments of high chroma can be obtained. The average particle size of the pigments customarily does not change in the course of this treatment.

Suitable peroxo compounds include for example peroxo salts of alkali metals such as sodium and potassium, especially sodium perborate and sodium percarbonate, and especially hydrogen peroxide.

When the preferred hydrogen peroxide is used as oxidant, an advantageous procedure is to heat a suspension of the bismuth vanadate pigment in an aqueous, generally from 3 to 50, preferably about 30, % strength by weight hydrogen peroxide solution to customarily from 50 to 100° C., especially about 95° C.

Here it is advisable to charge initially only a portion (about half) of the total amount of hydrogen peroxide solution used, with the pigment, and to add the remainder dropwise during the heating. In total, it is customary to use from 0.2 to 5 g of hydrogen peroxide solution per g of pigment.

After this oxidizing treatment, which generally takes from 0.5 to 3 h, the bismuth vanadate pigment can be isolated in a conventional manner by filtration, washing with water and drying.

Furthermore, the bismuth vanadate pigments of the invention can be stabilized against the action of heat, light or chemicals, especially to enhance their weatherfastness, by coating them with an inorganic or else organic protective sheath, which can be effected in a conventional manner for example by single- or multi-stage precipitation onto the pigments of aluminum, titanium, antimony, cerium, calcium, zirconium or silicon compounds, of zinc phosphate or mixtures thereof. This protective sheath customarily accounts for from 2 to 40, preferably from 2 to 20, particularly preferably from 3 to 10, % by weight of the total pigment.

A particularly pronounced stabilizing effect is provided by a combined coating of aluminum hydroxide, calcium phosphate and zinc phosphate, which is obtainable by successive precipitation of these compounds onto the bismuth vanadate pigments.

The coating with aluminum hydroxide can be effected by simultaneous addition of an aluminum salt solution, for example an aluminum nitrate solution, and of a sodium carbonate solution to establish a suitable pH for the precipitation of from about 6 to 6.5, to a stirred aqueous pigment suspension which has been heated to about 60–100° C., preferably about 80° C.

The coating with calcium phosphate can be effected by simultaneous addition of a calcium salt solution, for example a calcium nitrate solution, of a dilute phosphoric acid and of a sodium carbonate solution to establish a pH suitable for the precipitation of from about 5.5 to 6, to the stirred aqueous pigment suspension which has been heated to about 60–100° C., preferably about 80° C.

The coating with zinc phosphate can be accomplished similarly to the coating with calcium phosphate by using a zinc salt solution, especially a zinc nitrate solution.

After the coating, it is advisable to subject the pigment to a further grinding process.

In addition, the pigments of the invention can be obtained in the form of dustless fine granules by spray-drying an aqueous suspension.

The bismuth vanadate pigments of the invention are highly useful for pigmenting polymeric materials such as coatings, printing inks and plastics, and may also be used with other inorganic pigments such as luster effect pigments based for example on coated aluminum or mica platelets, organic pigments or dyes.

EXAMPLES

A) Preparation of Inventive Bismuth Vanadate Pigments

Example 1 a) A mixture of 233 g (0.5 mol) of $Bi_2O_3$, 45.5 g (0.25 mol) of $V_2O_5$ and was homogenized in the presence of 200 g of water and 150 g of glass beads (3 mm in diameter) in a 0.5 l plastic vessel in a Red Devil for 2 h.

After removal of the glass beads and drying, 70 g of the ground mixture were calcined at 770° C. in a preheated muffle furnace. After 1 h or 2 h the calcination was interrupted, and the mixture was rapidly cooled down to room temperature and then ground for about 5 min in a beater knife mill (Braun kitchen processor KM32 with mixing attachment KX32).

After a calcination time of 5 h, the product was slowly cooled down in the oven, which took about 16 h.

A mixture of 50 g of the resulting reddish orange calcination product and 200 ml of water was then bead-milled with 150 g of glass beads (0.49–0.7 mm in diameter) in a 0.5 l grinding capacity bead mill at 700 rpm for 7.25 h.

An orange pigment having an average particle size of 1.1 $\mu$m (50% value) was obtained by filtering off the glass balls, rinsing off the adherent pigment, renewed filtration and washing with acetone.

b) A mixture of 30 g of the ground pigment and a total of 200 ml of 30% strength by weight aqueous hydrogen peroxide solution was refluxed for 2.25 h. 100 ml of the hydrogen peroxide solution were charged initially with the pigment, and the remaining 100 ml were added dropwise during the heating.

After cooling to room temperature, the purified pigment was isolated by filtration, washed with water and dried under reduced pressure at 100° C.

27.3 g of $Bi_4V_2O_{11}$ were obtained as an orange pigment of unchanged particle size (Bi: obs. 75.05/comp. 75.05% by weight; V: obs. 9.03/comp. 9.15% by weight).

Example 2 a) A mixture of 163.1 g (0.35 mol) of $Bi_2O_3$ and 45.5 g (0.25 mol) of $V_2O_5$ was homogenized as described in Example 1a).

The calcination was likewise carried out as described in Example 1a), except that it was interrupted just once, after 2.5 h.

A mixture of 60 g of the resulting orange calcination product and 200 ml of water was then ground with 180 g of glass beads at 600 rpm for 6.5 h.

A yellowish orange pigment having an average particle size of 1.07 $\mu$m (50% value) was obtained.

b) 6 g of the ground pigment were then treated with 200 ml of hydrogen peroxide solution as described in Example 1b), except that the refluxing was carried out for 3 h.

This treatment gave 6 g of $(Bi_4V_2O_{11})_{0.4} \cdot (BiVO_4)_{0.6}$ as a bright yellowish orange pigment of unchanged particle size (Bi: obs. 69.0/comp. 70.1% by weight; V: obs. 12.4/comp. 12.2% by weight).

Example 3

A mixture of 1520 g of an aqueous bismuth nitrate solution (11% by weight of bismuth, 4.9% of free nitric acid) and 4 g of 85% strength by weight phosphoric acid was heated to the boil. Then initially 270 ml of 30% strength by weight sodium hydroxide solution were added over 10 min, followed by 461 g of 13.2% strength by weight sodium vanadate solution over 25 min (resulting pH: 0.9).

After stirring at the boil for one hour, the pH was adjusted to 3 by addition of 30% strength by weight sodium hydroxide solution, and the mixture was stirred at the boil for a further 2 h.

After cooling down to room temperature, the precipitation product was filtered off, washed nitrate-free with water and dried at 100° C.

230 g of $(Bi_4V_2O_{11})_{0.6} \cdot (BiVO_4)_{0.4}$ were obtained with a phosphate content of 0.3% by weight.

200 g of the precipitation product were then ground in a mixture with 250 ml of water using 200 g of glass balls (from 0.49 to 0.7 mm in diameter) in a stirred ball mill having a grinding capacity of 0.6 l at 900 rpm for 12 h to an average particle size of 0.74 $\mu$m (50% value).

60 g of the ground precipitation product were dried and then calcined at 670° C. for 2 h and subsequently slowly cooled down to room temperature (9 h to 200° C.).

The calcination product was then subjected to a renewed, six-hour wet grinding process at 800 rpm to obtain an average particle size of 0.74 μm.

A mixture of the ground calcination product with 300 ml of a 30% strength by weight aqueous hydrogen peroxide solution was then refluxed for 3 h.

After cooling down to room temperature, the purified pigment was filtered off, washed with water and dried under reduced pressure at 100° C.

This gave 58 g of reddish yellow pigment.

The pigment was then provided with an inorganic protective sheath comprising aluminum hydroxide, calcium phosphate and zinc phosphate.

To this end, 47.5 g of the pigment were dispersed in 450 ml of water by stirring for 2 hours. After heating to 80° C., a solution of 6.8 g of aluminum nitrate nonahydrate in 44.8 g of water was added over 45 min, during which the pH of the mixture was held within the range from 6.0 to 6.3 by the simultaneous addition of 10% strength by weight aqueous sodium carbonate solution.

Thereafter a solution of 3.6 g of calcium nitrate tetrahydrate in 44.8 g of water and a solution of 1.9 g of 85% strength by weight phosphoric acid in 44.8 g of water were added simultaneously over 30 min, during which the pH was maintained within the range from 5.5 to 6.0 by the simultaneous addition of 10% strength by weight aqueous sodium carbonate solution.

Zinc phosphate was precipitated similarly to calcium phosphate using a solution of 5.1 g of zinc nitrate hexahydrate in 44.8 g of water and 2.0 g of a solution of 85% strength by weight phosphoric acid in 44.8 g of water.

After subsequent stirring at 80° C. for one hour, the coated pigment was filtered off, washed nitrate-free and reground (80 min at 700 rpm).

The resulting reddish yellow pigment had an average particle size of 0.87 μm (50% value).

Example 4

141 ml of an aqueous sodium vanadate solution (6.2% by weight of vanadium), 429 ml of an aqueous bismuth nitrate solution (11% by weight of bismuth, 4.9% by weight of free nitric acid) and a solution of 2.5 g of 85% strength by weight phosphoric acid in 50 ml of water were added simultaneously to 300 ml of boiling water over 60 min while the pH of the mixture was held at 1 by the simultaneous addition of 30% strength by weight sodium hydroxide solution.

After 30 minutes' stirring at the boil, the pH was adjusted to 3.2 by addition of further sodium hydroxide solution, and the mixture was stirred at the boil for a further 2 h.

After cooling down to room temperature, the precipitation product was filtered off, washed nitrate-free with water and ground similarly to Example 3 to an average particle size of 0.87 μm (50% value).

80 g of the ground precipitation product were calcined similarly to Example 3 after drying, then reground (0.85 μm 50% value) and treated with 250 ml of hydrogen peroxide solution.

This gave 75 g of $(Bi_4V_2O_{11})_{0.6} \cdot (BiVO_4)_{0.4}$ having a phosphate content of 0.3% by weight in the form of a reddish yellow pigment.

47.5 g of the pigment were then coated with an inorganic protective sheath similarly to Example 3.

Subsequent grinding gave a reddish yellow pigment having an average particle size of 0.87 μm (50% value).

B) Evaluation of Bismuth Vanadate Pigments Obtained

The coloristic properties were evaluated by assessing coatings prepared as follows: a mixture of 5 g of the respective pigment and 20 g of acrylate baking finish (45% by weight solids content) was shaken with 25 g of glass balls (1 mm in diameter) using a Skandex machine for 60 min, then applied in hiding coats on aluminum Q panels (using a 200 μm wire-wound doctor) and baked at 130° C. for 30 min.

The resulting coatings were measured with a Datacolor 3890 using a measuring angle of 45° and standard illuminant D65 to determine the CIELAB values of hue angle Hue [°], chroma C* and lightness L*.

The results are shown for each pigment in the table below before and after the hydrogen peroxide treatment (Examples 1 and 2) and after the coating with the inorganic protective sheath (Examples 3 and 4).

TABLE

| Ex. | Hue [°] | C* | L* |
| --- | --- | --- | --- |
| 1a | 66.2 | 74.7 | 63.9 |
| 1b | 64.8 | 77.0 | 64.1 |
| 2a | 76.6 | 78.2 | 69.4 |
| 2b | 74.3 | 81.4 | 69.7 |
| 3 | 76.4 | 87.7 | 74.6 |
| 4 | 77.9 | 83.4 | 73.8 |

We claim:

1. A bismuth vanadate pigment of the formula:

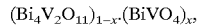

$$(Bi_4V_2O_{11})_{1-x} \cdot (BiVO_4)_x,$$

wherein 0.2≦x<0.9, further comprising from 0–0.5% by weight of phosphorous in the form of bismuth phosphate, the pigment having a CIELAB hue angle ranging from 64–91°, a chroma of from 72–95 and a lightness≧62 as determined at a measuring angle of 45° and standard illuminant D65.

2. A process for preparing a bismuth vanadate pigment as claimed in claim 1, which comprises:

calcining a homogeneous mixture of bismuth oxide and vanadium oxide at a temperature from 600–900° C. for 2–12 hours;

slowly cooling the calcination product to room temperature, wherein cooling to a temperature of about 200° C. occurs in 6–20 hours; and subjecting the cooled calcination product to grinding.

3. The process as claimed in claim 2, further comprising:

treating an aqueous suspension of the ground calcination product with a peroxo compound.

4. The process as claimed in claim 2, comprising:

interrupting the calcination at least once, subjecting the cooled mixture to a dry grinding process and then subsequently continuing calcination, wherein the time required for cooling and grinding is not counted as part of the time required for calcination.

5. The process as claimed in claim 2, wherein the mixture of bismuth oxide and vanadium oxide is prepared by grinding of the oxides in an aqueous suspension.

6. A process for preparing bismuth vanadate pigment as claimed in claim 1, which comprises:

heating an acidic bismuth salt solution to not more than 105° C. in the presence of dissolved phosphate;

initially adding from 200–400 mol. %, based on bismuth, of an alkali metal hydroxide in an aqueous solution to the acidic bismuth salt solution and subsequently adding a vanadate solution;

upon completion of precipitation, adjusting the pH of the aqueous mixture to 2–6;

stirring the mixture for 0.5–5 hour; and thereafter performing the steps whereby the precipitated product is isolated, washed salt-free, ground and then calcined at a temperature from 500–800° C. for about 0.5–3 hours;

slowly cooling the calcined product to room temperature, the cooling to a temperature of about 200° C. taking not less than 6 hours; and grinding the cooled product.

7. The process as claimed in claim 6, wherein after isolating and washing the product to a salt-free state, the product is dried before being ground.

8. The process as claimed in claim 6, wherein the ground calcined product is treated in an aqueous suspension with a peroxo compound.

9. A process for preparing a bismuth vanadate pigment as claimed in claim 1, which comprises:

introducing an acidic bismuth salt solution, a vanadate solution and a phosphate solution simultaneously into hot water at a temperature not greater than 100° C. while maintaining the pH of the mixture at from 0.8–3 by addition of an alkali metal hydroxide;

upon completion of precipitation of the product of the reaction, adjusting the pH of the mixture to 2–6;

stirring the mixture for 0.5–5 hours; and thereafter performing the steps whereby the precipitated product is isolated, washed salt-free, ground and calcined at a temperature from 500–800° C. for a time of 0.5–3 hours;

slowly cooling the product to room temperature, the cooling to about 200° C. occurring in not less than 6 hours; and grinding the cooled product.

10. The process as claimed in claim 9, wherein after isolating and washing the product such that it is salt-free, the product is dried before it is ground and calcined.

11. The process as claimed in claim 9, wherein the calcined and ground product is treated in an aqueous suspension with a peroxo compound.

12. The process as claimed in claim 2, wherein the pigment obtained is coated with aluminum hydroxide, calcium phosphate or zinc phosphate.

13. The process as claimed in claim 6, wherein the pigment obtained is coated with aluminum hydroxide, calcium phosphate or zinc phosphate.

14. The process as claimed in claim 9, wherein the pigment obtained is coated with aluminum hydroxide, calcium phosphate or zinc phosphate.

15. A method of coloring polymeric material, comprising:

uniformly mixing the bismuth vanadate pigment as claimed in claim 1 into a polymeric material.

16. A method of coloring coatings, printing inks and plastics, comprising:

uniformly incorporating the bismuth vanadate pigment as claimed in claim 1 into a coating, printing ink or plastic.

17. A colored preparation comprising a colorable material and the bismuth vanadate pigment as claimed in claim 1 as the coloring pigment.

* * * * *

UNITED STATES PATENT AND TRADEMARK OFFICE
CERTIFICATE OF CORRECTION

PATENT NO. : 5,958,126
DATED : September 28, 1999
INVENTOR(S) : Jörg Adel et al.

It is certified that error appears in the above-identified patent and that said Letters Patent is hereby corrected as shown below:

<u>Title page,</u>
Item [75], the 4th and 5th Inventors were omitted. The inventors should read as follows:

-- [75] Inventors: Jörg Adel, Ludwigshafen; Boubacar Camara, Auenwald; Norbert Mronga, Dossenheim; Matthias Zech, Niederkirchen; Hansulrich Reisacher, Maxdorf, all of Germany --

Item [30], the Foreign Application Priority Data was omitted. It should be:

-- [30] Foreign Application Priority Data
Nov. 4, 1996 [DE] Germany......19645314 --

Signed and Sealed this

Fourth Day of September, 2001

*Attest:*

*Attesting Officer*

NICHOLAS P. GODICI
*Acting Director of the United States Patent and Trademark Office*